UNITED STATES PATENT OFFICE.

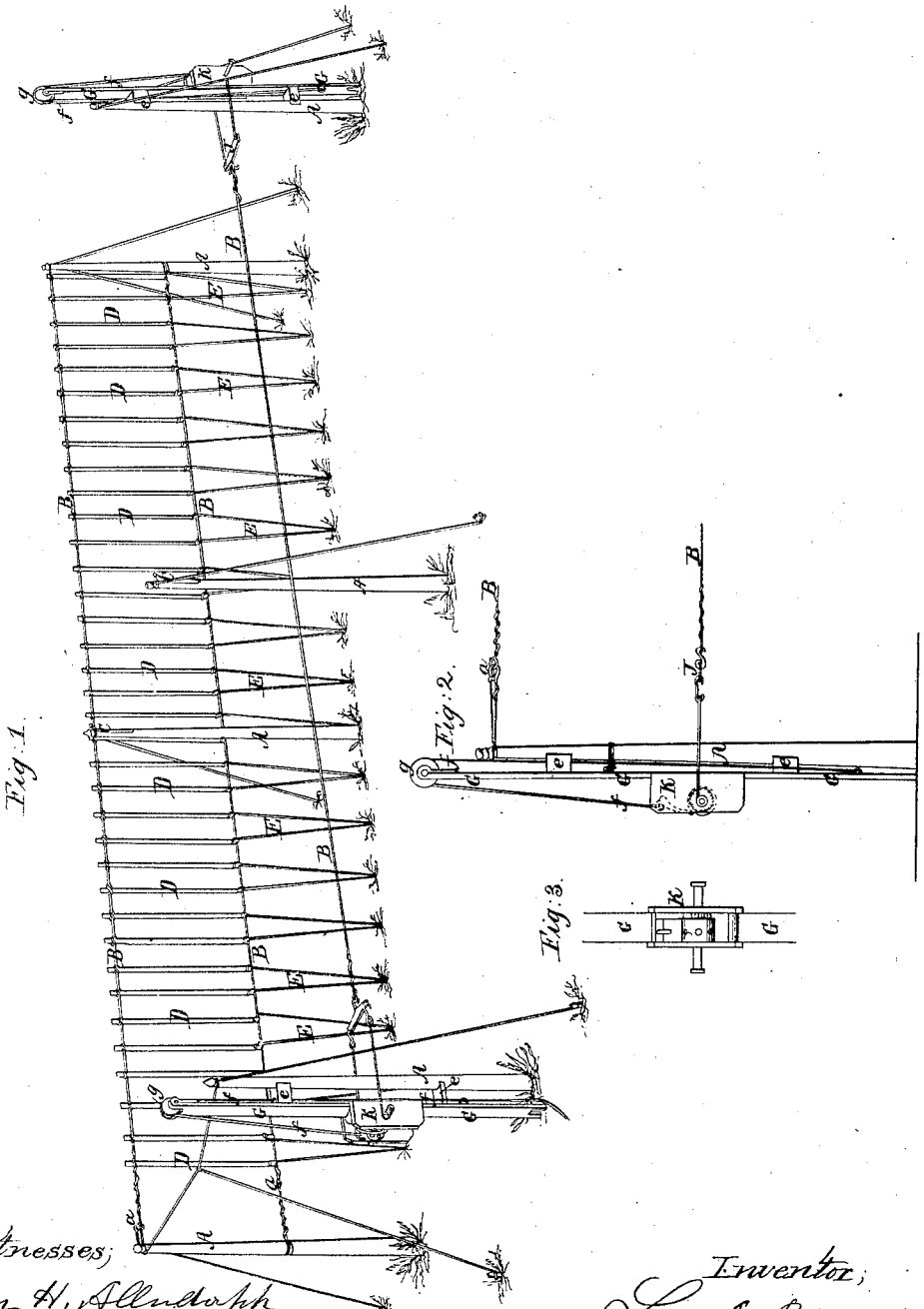

LEVI A. BEARDSLEY, OF SOUTH EDMESTON, NEW YORK.

IMPROVEMENT IN HOP-FRAMES.

Specification forming part of Letters Patent No. 26,743, dated January 10, 1860.

*To all whom it may concern:*

Be it known that I, LEVI A. BEARDSLEY, of South Edmeston, in the county of Otsego and State of New York, have invented a new and useful Improvement in Hop-Frames; and I do hereby declare that the following is a full, clear, and exact description thereof, reference being had to the accompanying drawings, forming a part of this specification, in which—

Figure 1 represents my improved hop-frame in perspective with my mode of raising and lowering the same. Fig. 2 shows the device in an enlarged view to be applied to the posts for raising and lowering the vines. Fig. 3 is a view of the device in detail.

A A A represent the posts for supporting the wires upon which the vines run, which posts may be from twelve to fifteen feet high, or even higher, if necessary. The wires B B, usually two, are secured to the two extreme posts, one at the top and the other about midway of the post, by forming a loop and twisting the wire around itself, and then passing through this loop or eye a short wire, with its end twisted in the same manner, so as to form a loop. This short wire is then passed around the post, and with a small hook, *a*, it is secured to the eye of the longer wire, B. The wires rest upon hooks *c c*, fixed upon the intermediate posts.

Between the wires B B, and at a suitable distance apart, are arranged vertical sticks D D, with their lower ends notched, so as to fit upon the wire. Their upper ends are secured to the top wire by strings or wires. The strips D D being thus secured to the wires, the vines are trained up to them upon strings E E, as shown by Fig. 1 of the drawings. By means of these vertical strips D D, each one being connected to the ground by a string, the frame is made very stiff, and the destructiveness to the hops by the force of the wind upon the vines is in a great measure prevented. These sticks prevent the frame from surging about, and thus shaking and scattering the hops upon the ground, while the wind may have a free passage underneath of the frame, where the vine is to be kept thinned out. These frames are placed in rows side by side, and the usual distance apart to expose the vines to the sun. When the hops are ready for gathering strips G G are tied to the two extreme posts of a frame, the blocks *e e* serving to keep the strips vertical and the wires B B relieved from the hooks *a a*. Yokes J J are then hooked into the loops of the long wires B, and these wires are tightened up by a small windlass, which is fixed in a box, K, which is made to slide upon the strips, and which is raised or depressed by cords *f f* passing over pulleys *g g* in the tops of the strips. By fastening this cord to a hook, as shown by Fig. 2, the blocks will remain fixed in any position upon the strips. When the wires have been attached to the yokes J J they can be lowered by the pulley-cords *f* until they are within reach for gathering those hops which are ripe. After this is done the wires or frames are then elevated to their former position and again secured to the posts, as before described. The strips G G, with their sliding boxes and yokes, are removed to another frame, and the vines lowered within reach of the gatherer.

The sliding boxes used by me consist of two side plates, with rollers which bear upon the side of the strips G G, so as to facilitate their motion and to lessen the friction. The boxes are also furnished with rollers, which are rotated by a lever or crank, and upon which the chains which are attached to the yokes are wound in tightening the wires. A pawl and ratchet acts upon these rollers so as to prevent the cord from unwinding.

I do not wish to confine myself to any one particular device for raising or depressing the frames, for there are various means by which this may be done.

A pulley and cord may be attached at the tops of the intermediate posts for supporting the wire and preventing the great weight of the vines from breaking it while it is being lowered.

What I claim as my invention, and desire to secure by Letters Patent, is—

The employment of a frame-holder composed of a sliding box, K, with a windlass or roller to tighten the wire and a vertical bed or strip, G, to guide or support the box K, substantially as and for the purpose herein shown and described.

LEVI A. BEARDSLEY.

Witnesses:
JOHN H. ALENDORPH,
BENJAMIN WARNER.